United States Patent [19]

Lulejian

[11] 4,431,436

[45] Feb. 14, 1984

[54] GLASSWARE REJECTION APPARATUS

[75] Inventor: Donald A. Lulejian, Cornwells Heights, Pa.

[73] Assignee: CSS International Corporation, Philadelphia, Pa.

[21] Appl. No.: 400,562

[22] Filed: Jul. 21, 1982

[51] Int. Cl.³ .............................................. C03B 9/44
[52] U.S. Cl. ..................................... 65/159; 65/160; 65/165; 65/DIG. 13; 364/473
[58] Field of Search ......... 65/159, 160, 165, DIG. 13; 364/473

[56] References Cited

U.S. PATENT DOCUMENTS

| | | | |
|---|---|---|---|
| 3,767,374 | 10/1973 | Iacovazzi et al. | 65/165 |
| 3,957,477 | 5/1976 | Jones et al. | 65/158 |
| 4,152,134 | 5/1979 | Dowling et al. | 65/163 |
| 4,332,606 | 6/1982 | Gardner | 65/160 |
| 4,351,663 | 9/1982 | Wood | 65/165 X |
| 4,354,865 | 10/1982 | Poad et al. | 65/159 X |
| 4,369,052 | 1/1983 | Hotmer | 65/160 |

OTHER PUBLICATIONS

"Emhart 524 Hot Ware Selector" by Emhart Industries, *Glass Industries Magazine*, Aug. 1982.

*Primary Examiner*—Arthur D. Kellogg
*Attorney, Agent, or Firm*—John J. Simkanich

[57] ABSTRACT

An apparatus for automatically or manually controlling the rejection of specific articles of glassware or other objects produced by I. S. Machines or other manufacturing equipment includes a control circuit for monitoring the sequence of operation of a plurality of individual identical manufacturing machines and for electronically controlling a rejector apparatus in relation to the programmed operation of any of particular ones of the individual manufacturing machines or in response to operator manual control.

10 Claims, 7 Drawing Figures

GLASSWARE REJECTION APPARATUS

BACKGROUND OF THE INVENTION

This invention relates to circuitry for electronically controlling the rejection of glassware produced by any of individual ones of identical manufacturing machines in response to a manual input from an operator or automatically following a specified operation on an individual one of such machines.

The glassware manufacturing industry is moving from mechanically operated and controlled glassware manufacturing machines to electronically controlled and electrically operated machines.

Mylchreest and Wythe in U.S. Pat. No. 3,877,915 show an electronic control system for a glassware molding machine including a control program for operating sequentially in any predetermined order the individual glassware producing sections of the machine.

William J. Croughwell in U.S. Pat. Nos. Re. 29,188 (3,905,793) shows an improved computer control for a glassware molding machine. This circuit includes means for updating the computer control program, a circuit for starting and stopping cyclic control, and a circuit for event selection.

Peters, U.S. Pat. Nos. 4,162,909, Forkas et al., 4,145,205, and Forkas et al., 4,145,204, show detection and pulse generation circuitry for use with control circuitry in glassware molding machinery.

Iacovazzi et al., U.S. Pat. Nos. 3,767,374, and Dowling et al., 4,152,134 each show circuits used in the rejection of glassware produced from an I.S. machine.

The Iacovazzi apparatus rejects malformed bottles coming from a particular individual section and deposited in a sequential order on a common conveyor.

A selector panel is connected with the sequential timer operated in synchronism with the operation of the multi-section machine. This selector panel has a plurality of manually operated switches corresponding respectively with each of the individual sections. When a particular mold is malfunctioning, the corresponding switch on the selector panel is actuated and electrical timing signals from the sequential timer cause the ejector mechanism to remove each article produced by the malfunctioning section.

The Iacovazzi circuit includes merely a delay circuit portion and a selection switch portion.

The Dowling apparatus is an add function implemented by the main computer, a commercial unit used in multiplexed fashion to control the operation of multi-section I.S. Machine. This apparatus includes a circuit connection from the supervisory computer to a bottle reject control panel and bottle reject station. An operator designates bottles to be rejected, by section and mold, and number of machine cycles. The supervisory computer receives this information from the control panel to generate control signals to the reject station when the multi-section machine reaches the corresponding position in the machine cycle. The supervisory computer of Dowling is a commercially available general purpose unit supplied by Digital Equipment Corporation and designated as an LSI-11 computer.

The simple Iacovazzi circuit lacks versatility and the capacity to handle various circumstances. The Dowling circuit depends upon the central commercially available computer to handle all logical and circuit functions. If this Dowling computer malfunctions, or if it is overloaded either as to its input/output interface or as to its data transfer speed or arithmetic unit, the glassware rejection function will be degraded or disrupted. This could allow "bad" glassware to get through and defeat the purpose of the rejection function.

Emhart Machinery offers for sale an electronic "524" hotware selector which permits an operator to select ware to discard continuously from any cavity or section of a glassware molding machine. The selector comprises a plurality of identical selection switches located in front of each section, each switch comprising a bank of selector buttons, one for each cavity of a multi-cavity section. An operator manually selects ware to be rejected by pushing one of the buttons. A timing pulse generator is mounted on the conveyor carrying ware from the I.S. machine output to drive the circuitry.

An object of the present invention is to provide a separate control circuit for rejecting glassware from a multi-section I.S. machine and for handling a variety of such rejection circumstances.

A second object of the present invention is to provide such a circuit being dedicated solely to the rejecting of the glassware and which functions independently of the central control computer or other controller circuits for an integrated electronic glassware manufacturing installation.

A further object is to provide such dedicated circuitry with reliable and dependable response irrespective of the operation of the other control circuitry of the glassware manufacturing installation.

SUMMARY OF THE INVENTION

The objects of the present invention are realized in a control circuit apparatus for individually controlling the operation of a plurality of rejection plungers at specified locations along a glassware conveyor for rejecting glassware determined by the operator to be undesirable, this undesirability being either manually set into a control panel by the operator or automatically determined by the control circuit based on information input into the control panel.

The circuit can control three modes of operation for the rejection plunger:
(1) reject every glassware article produced by a particular I.S. machine section;
(1b) reject every glassware article produced by I.S. machine;
(2) reject every glassware article produced by a particular cavity of a particular section or a particular glassware article produced by that particular cavity of a particular section;
(3) reject a given number of glassware articles, which number is adjustable and is preset, after an operation time.

In this last mode (Number 3), the circuit counts the number of "good" articles already in the system to calculate the location of the "bad" or rejectable article(s).

A skip cycle can also be set.

A timing signal can be obtained from the master timing point on the multi-section I.S. machine. This signal can be used by instruction circuitry and by glassware selection circuitry to drive any or all of the plurality of rejection devices in conjunction with an additional input from a cycle selection circuit.

A thumb wheel switch may enter information into the circuitry for searching for the correct section sequence to direct a reject operation. A plurality of toggle switches can be used for each section to define which glassware product from which mold of each section should be rejected.

The control circuitry determines glassware article order, calculates the timing sequence and the number of articles and the spacing between glassware articles for rejection.

DESCRIPTION OF THE DRAWINGS

The features, advantages and operation of the glassware rejection apparatus of the present invention may be better understood from a reading of the following detailed description of the invention in connection with the enclosed drawings in which like numerals refer to like elements and in which.

DETAILED DESCRIPTION OF THE INVENTION

Figure 1:
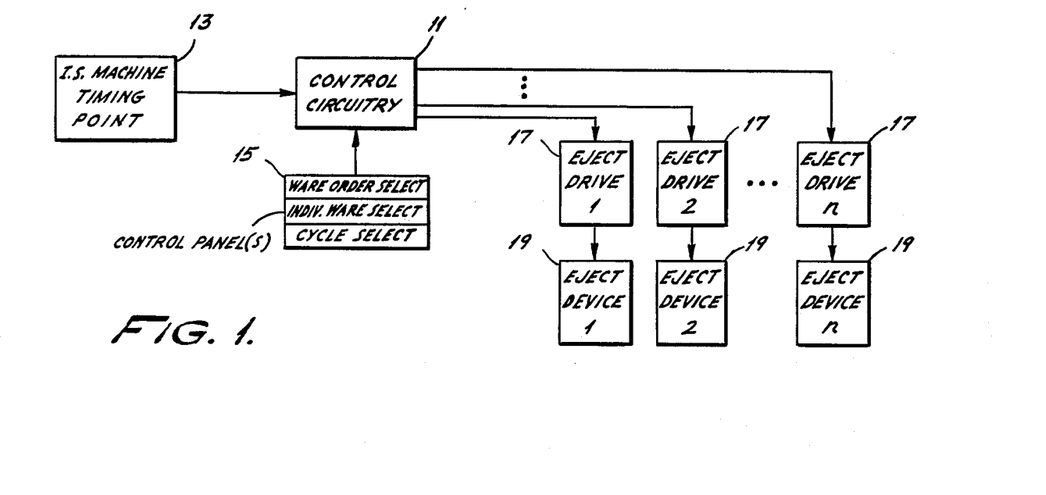
FIG. 1 is a general system block diagram for the glassware rejection apparatus.

The automatic or manual rejection of specific articles of glassware or other objects produced by an I.S. machine or or other glassware manufacturing equipment includes central control circuitry 11, FIG. 1. This control circuitry 11 receives synchronization and speed information from the I.S. machine timing point 13. The circuitry 11 also receives instructions from an operator control panel 15 for individual ware select, cycle select and ware order select in order to control the rejection of specific articles of glassware. The control circuitry 11 drives any of a plurality of identical rejection drive circuits 17 which in turn control the operation of a respective plurality of identical rejection devices 19.

A multi-section glassware production machine can be made up of a plurality (4, or 6, or 8, or 10) of individual sections (independent glassware molding units) installed in a series and providing glassware output onto a common conveyor. The glassware articles output from each section are not produced in sequential order along the series but in an order (much like the firing order of an automobile engine) which reduces or eliminates bottlenecking or collision on the common conveyor for carrying away the articles and promotes the even spacing of glassware. Glassware rejection devices 19 are positioned downstream from the output area of the individual sections and are used to remove undesired glassware articles.

When the rejection devices 19 are pneumatic, the rejection drive units 17 are pneumatic control apparatus. However, these devices 19 are preferably electrically operated solonoid units with electrical controls 17.

Figure 2:
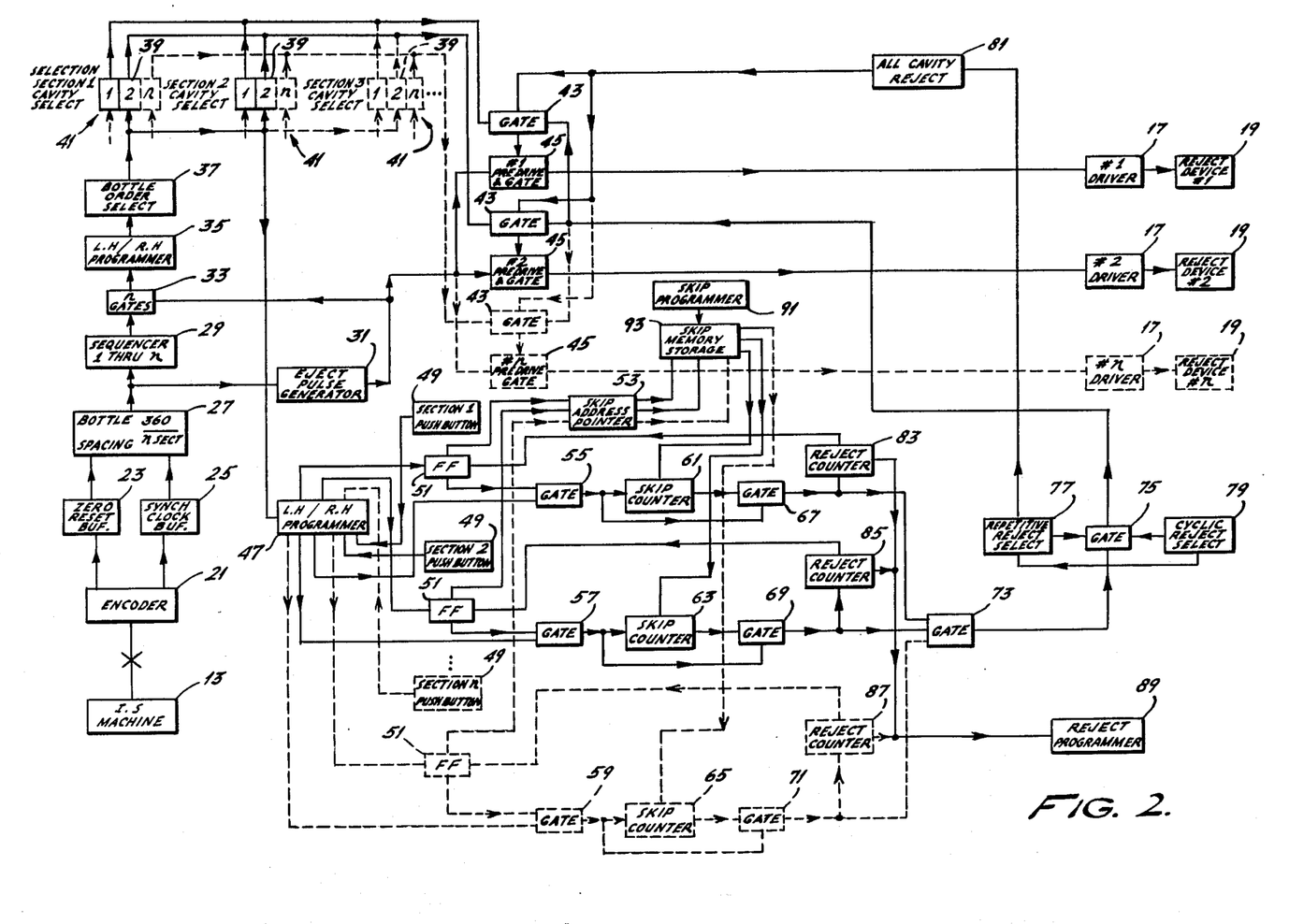
FIG. 2 is a general circuit block diagram for the apparatus of FIG. 1.

FIG. 2 shows a circuit block diagram for the control circuitry 11 of FIG. 1 and its interface with the control panel 15 and reject drives 17 and their connected rejection devices 19.

The control circuitry 11 and its relationship to the I.S. machine timing point 13 and control panel 15 along with the plurality of rejection drives 17 and rejection devices 19 are shown in greater detail in this FIG. 2. A mechanically driven electro-optical connection is made with the I.S. machine 13 for picking off a speed and synchronization with the operation of the I.S. machine 13. This connection is made with an electro-optical encoder 21 which feeds signals to both a zero reset buffer 23 and a synchronous clock buffer 25 connected in parallel. The output from both the zero reset buffer 23 and synchronous clock buffer 25 are fed to a bottle spacing circuit 27 which receives information on the spacing of glassware articles produced by the multi-section machine with respect to an imaginary 360° spacing cycle, and as a function of the number of mold cavities ("n") in each individual section, and thereby calculates a spacing factor.

The output from the bottle spacing circuit 27 is sent to a sequencer circuit 29 for providing a series of 1 through n pulses. The output from this bottle spacing circuit 27 is also fed to an eject pulse generator 31.

Sequencer 29 is connected to each of 1 through n gates 33 which in turn receive pulse signals as the output of the eject pulse generator 31. The output of the n gates 33 is fed to a first left hand/right hand programmer circuit 35 which in turn feeds a bottle order select circuit 37 which in turn is connected to a plurality of individual toggle switches 39 for each individual cavity selection of each section 41 of the multi-section glassware forming machine. From each of the cascaded selection switches 39, grouped as to individual machine sections 41, a connection is made to a respective one of a plurality of output driver gates 43, one of each which in turn is connected on its output to a respective one of a plurality of pre-drive and gate circuits 45. Each of these pre-drive and gate circuits 45 is dedicated to operate an individual one of the rejection drive circuits 17 and its respective connected rejection device 19. The operation of each of the pre-drive and gate circuits 45 is synchronized by a common connection to the output of the eject pulse generator 31.

The output of the bottle order select circuit 37 is also fed to a second left hand/right hand programmer circuit 47. This second left hand/right hand programmer, circuit 47, as with the first programmer circuit 35, provides output sequences as a function of input data regarding whether the multi-section "battery" of individual section glassware molding machines are set up for a left handed or a right handed discharge.

The second left hand/right hand programmer circuit 47 receives inputs from any of a plurality of push buttons 49, one each being dedicated to each section of the multi-section machine. This second programmer circuit 47 provides outputs to a plurality of flip flops 51 which each provide an output to a respective one of a plurality of skip address pointer circuits 53. The output from the first one of these flip flops 51 is connected to a first skip gate 55 while an output from the second one of the flip flops 51 is connected to a second skip gate 57, whereof the first and second gates 55-57 are identical and perform identical functions in separate dedicated circuits for each section of the multi-section machine. The "nth" flip flop 51 provides an output to the "nth" skip gate 59. Each of the gates 55, 57, 59 receives an additional synchronizing input from the programmer 47.

The output of each of the respective skip gates 55, 57, 59 is connected to its respective skip counter 61, 63, 65 as well as a respective output gate 67, 69, 71. Each of the output gates 67, 69, 71 is connected to receive an input from its respective skip counter 61, 63, 65 and its respective skip gate 55, 57, 59. The output from each of the output gates 67, 69, 71 are summed into an output summing gate 73 whose output is in turn connected to another summing gate 75. This other summing gate 75 receives an input connection from both a repetitive rejection selection circuit 77 and a cyclic rejection selection circuit 79. A second output from the cyclic rejection selection circuit 79 is also connected into the repetitive rejection selection circuit 77.

Another output from the repetitive rejection selection circuit 77 is connected through an all cavity rejection selection circuit 81 to trigger each of the gates 43 driving the pre-drive and gate circuits 45. The output from the summing gate 75 is fed to each of the previously discussed pre-drive gates 43.

Each of the respective skip counters 61, 63, 65 output gates 67, 69, 71 has its output also connected to an individual respective rejection counter 83, 85, 87 which counters each respectively provide a feedback signal to its respective flip flop 51. A second output from each of the rejection counters 83, 85, 87 is connected to provide an input to a rejection programmer circuit 89.

In operation, this circuit apparatus of FIG. 2 provides an independent circuit for controlling and determing the rejection of glassware under operator programmed, computer memory-type control for a multi-cavity, multi-section glassware manufacturing I.S. machine by controlling the operation of a plurality of rejection devices 19, one each being dedicated to a particular section 41 of the multi-section I.S. machine 13. The circuitry can be operated to reject the glassware produced by all of the cavities from an individual section or all of the cavities from any or all sections of a multi-section machine. It can also be programmed to reject the glassware produced from a particular cavity or from a particular section, either continuously or for a certain repetitive number of glassware articles. The circuit was entered into its skip memory the number of articles determined to be "good" and already on the conveyor before a "defective" article appears before its respective rejection device 19.

The circuit apparatus uses the information stored in a skip programmer 91 which supplies information to a skip memory storage circuit 93 to determine the number of good glassware articles already in the system which should be allowed to pass a respective rejection device 19 before a defective glassware article is rejected. The skip programmer 91 output is connected to the skip memory storage 93. The skip memory storage 93 receives inputs from the skip address pointer 53 and provides a plurality of outputs, one each, to each of the plural skip counters 61, 63, 651. The circuit itself also keeps track of the so called "firing order" in order to determine the respective locations of the defective glassware products from a particular individual section.

For the circuit of FIG. 2, the timing connection to the I.S. machine 13 is a mechanical coupling to the encoder 21 which is implemented as an electro-optical signal generator. The bottle spacing circuit 27 is a decoding pulse gate which acts as a programmable decoder which divides a 360° cycle period by n, a selectable number. The sequencer 29 generates the selected "n" number of sequence signals for each incoming pulse. The "n" gates 33 represent that selected number of AND gates to handle the number of sections for which the circuit is designed. Left hand/right hand programmer 35 is controlled from operator thumb wheel switches located on the control panel 15. The bottle order select 37 is implemented by a thumb wheel switch on the operator panel 15, which can be set to input the "bottle order" of the multi-section machine.

The section selection switches, i.e. push buttons 49, are also located on the control panel 15 or at a location adjacent to the respective section. Both the left hand/right hand programmers 35 and 47 are used to provide the sequencing for the multi-section machine being set up for either left handed or right handed delivery. This is of importance because in the normal manufacturing layout, the rejection devices 19 cannot be located adjacent the output from a particular section, but must be positioned downstream from the multi-section machine along a conveyor belt which carries the product from all sections in a single line formation. Timing and sequence, therefore, is very important. The circuitry must determine the precise time and location of defective glassware articles while permitting an acceptable glassware article to pass the rejection devices 19. In this regard the skip address pointer 53 carries the address location for the sequential line of glassware for the particular section, i.e. the glassware to be skipped before a rejection operation.

The skip counters 61, 63, 65 are loaded with a number which represents the number of acceptable glassware articles which are permitted to pass a respective rejection device 19 before the defective glassware article appears to be rejected. Typically, with a left handed delivery setup, section 1 is closest to the downstream rejectors, while with a right hand delivery setup the highest number section is closest to the rejectors.

The circuitry provides at least two modes of operation. The first of these is a repetitive one where all glassware from a particular section is continually rejected. The second mode is a cyclic one where glassware as to a particular number of articles, or a particular number of articles produced at a particular time are rejected.

The bottle select circuit 37 is implemented by a binary coded decimal thumb wheel switch. The cavity selection switches 39 for each of individual sections 41 are implemented by a plurality of identical toggle switches. The cyclic rejection selection circuit 79 is implemented with a rotary switch connected for binary coded decimal operation, as well as, is the repetitive rejection selection circuit 77.

Figure 3:
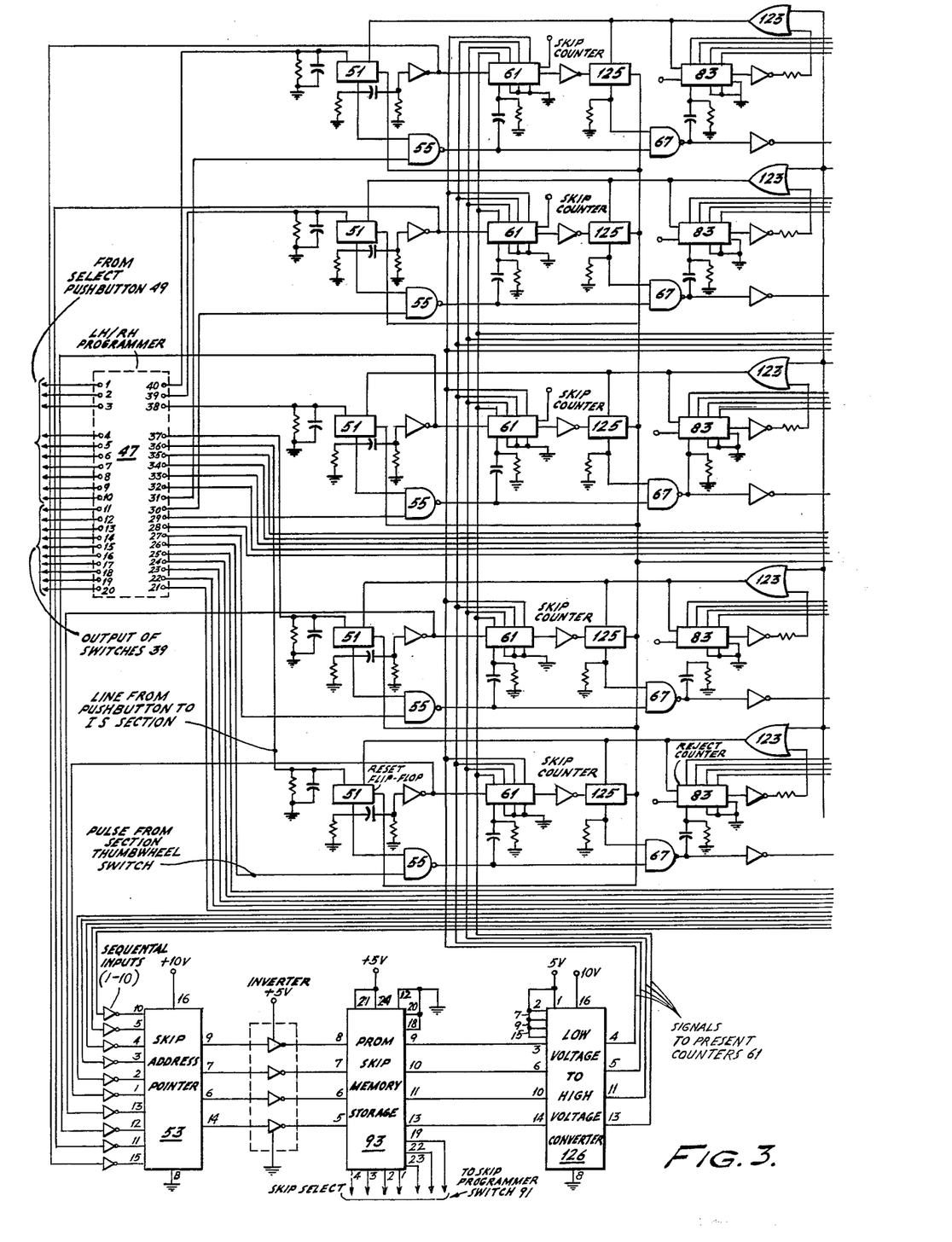
FIGS. 3-5 are the detailed circuit diagram for the circuit of FIG. 2.
Figure 4:
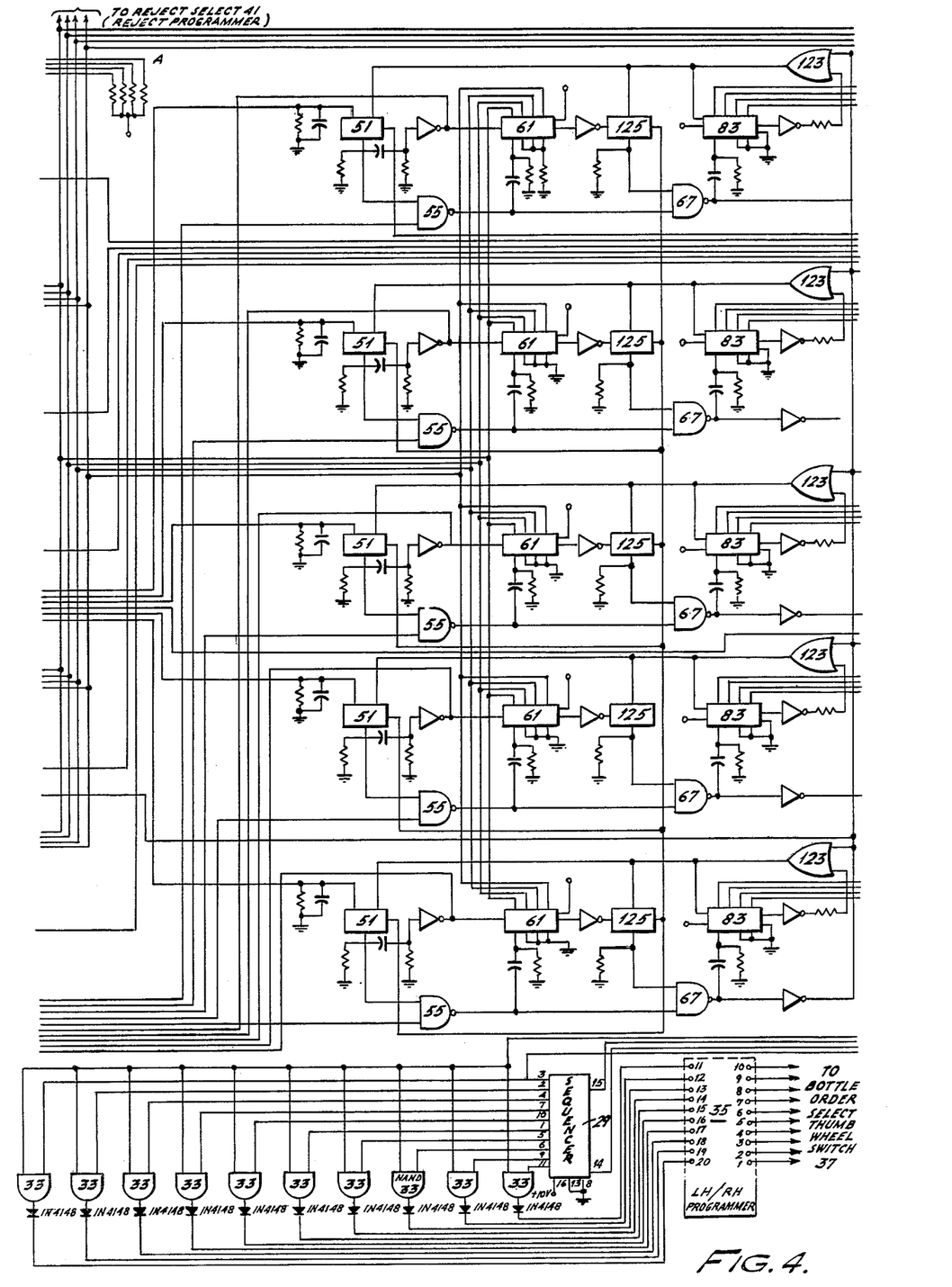
Figure 5:
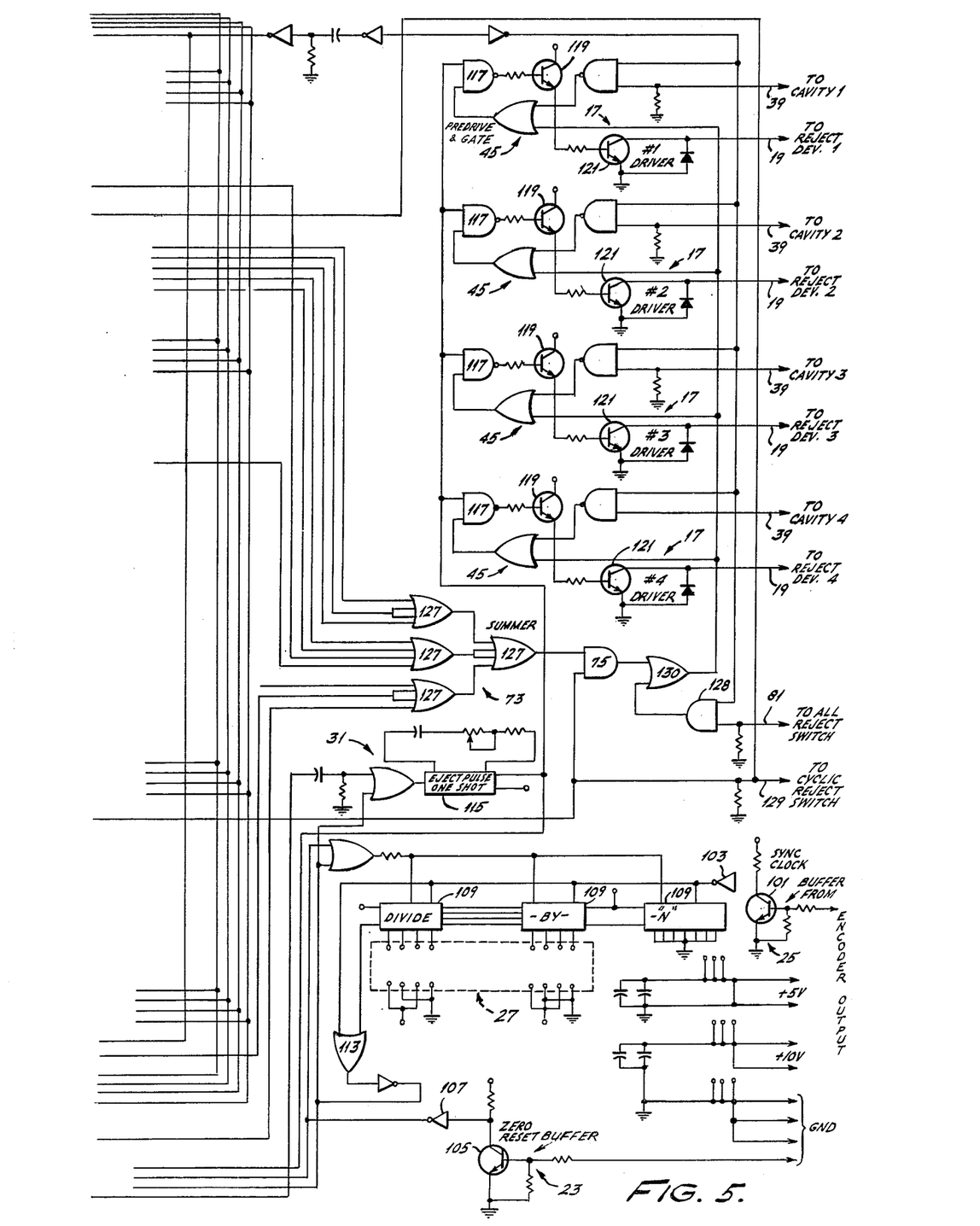

FIGS. 3, 4 and 5 show some of the detailed circuit implementation of the circuitry of FIG. 2. The output from the electro-optical encoder 21 is connected to the synchronous clock buffer 25 which is implemented by a 2N2222A transistor 101 circuit having an RCA type 4049 output driver 103. The zero reset buffer 23 is implemented by an identical transistor 105 and output driver 107 circuits to the clock buffer 25. Both the synchronous clock buffer circuit 25 and the zero reset buffer 23 outputs are connected into the bottle spacing circuit 27 which is implemented by three ganged RCA type 4029 chips 109 to form a recyclable down counter, the initial value for which is set by the value entry circuit 111. The output from the least significant digit of counter 109 is connected through an RCA type 4071 component 113 with the output of the synchronous clock buffer driver 103 to provide an input to the sequencer circuit 29. This sequencer 29 is implemented by an RCA type 4017 chip. The outputs from the sequencer 29 chip are input into a plurality of gates 33 (10 NAND gates for a 10 section machine) implemented by RCA type 4081 NAND gates. The output from each of the gates 33 is fed into the first left hand/right hand programmer 35 implemented by an RCA type 4017 chip via respective individual 1N4148 diodes. The output from the first left hand/right hand programmer 35 is connected to the bottle order select thumb wheel switch 37.

An output from the bottle spacing divide-by-n counter 109 is connected via the OR gate 113 to the eject pulse generator 31. Eject pulse generator 31 is implemented by a "one-shot" type circuit utilizing a RCA 4047 type chip 115. An output from this "one-shot" 115 circuit is connected in common to the plurality of identical pre-drive and gate circuits 45 (one for each section) which are each implemented by 4081 type gates 117 and a 2N222A transistor 119 pre-drive circuit which in turn drives each of the driver circuits 17 implemented with 2N3725A transistors 121. The output of these driver transistors 121 circuit is connected directly to each of the individual rejection devices 19. Transistors 121 and attendant circuitry comprise each of the drivers 17, An output from the section selection pushbuttons 40 and the section and cavity selection switches 39/41 are input to the second left hand/right hand programmer 47. An output of this left hand/right hand programmer 47 is connected to the "feed back" flip flop 51 for each circuit portion dedicated to each individual section. When the invention is used for a ten section machine, there are ten identical circuits having identical components, one for each individual section. The output from the flip flop 51, in each of the circuits, is connected to the gate 55 (wherein gate 55 is identical to the gates 57 and 59 of FIG. 2).

The output of the gate 55 is connected to a skip counter 61 wherein skip counter 61 is implemented by an RCA type 4029 chip (the skip counters 63 and 65 FIG. 2 are identical to skip counter 61). The flip flops 51 are implemented by a 4043 type chip and the gates 55 are implemented by a 4011 type chip. The output from each of the skip counters 61 is connected to a respective gate 67, FIG. 3, which is likewise implemented by a 4011 chip (and is identical to the gates 55, 57, 59 of FIG. 2). The gates 67 are also identical to the gates 69, 71 of FIG. 2. The output of each of these gates 67 is connected to a respective second RCA 4029 type chip which is connected to form each respective reject counter 83 (the reject counters 83 are identical to the reject counters 85 and 87 of FIG. 2).

NOR gates 123 are implemented with a type 4071 chip. These gates 123 provide a feedback signal to reset the flip flops 51.

A "RS" flip flop 125, such as found on an RCA 4043 chip, is integrated into the output of the skip counter 61. The inverted "Q" output from each of the flip flops 51 is connected to its respective skip address pointer 53, these pointers 53 being implemented with an RCA type 40147 chip. The skip address pointer circuit 53 outputs are connected into the skip memory storage unit 93. This memory storage unit 93 is a programmable read only memory and is implemented by an Intel Corporation model No. I-2716 chip. This "PROM" receives inputs from the skip programmer switch 91 and outputs information through a low voltage to a high voltage converter 126 implemented with an RCA type 40109 chip. This information is directly connected to preset the skip counters 61. Individual lines from the PROM 93 to the converter 126 can program each of the skip counters 61 to a different value or to an identical value. The outputs from each skip counter 61 are connected through a respective gate 67 to be summed together through a series of OR gates 127, which comprise the gate 73 of FIG. 2. The output from this summer gate 73 is then summed into an additional series of gates forming the summing gate 75 of FIG. 2 and implemented by 4071 type gates. A skip cycle reject toggle switch input 129 provides a signal input into this summing gate 75 which on its output drives each of the pre-drive and gate circuits 45 to cause a rejection operation on each of the rejection devices 19.

An input from the all cavity rejection toggle 81 is entered through a 4081 type gate 128 and through an OR gate 130 of the 4071 type to connect to each of the individual rejection circuitry pre-drive circuits 45.

Each of the rejection counters 83 also receives inputs from the section selection switches 41 which act in a group as the rejection programmer portion of the control panel 15.

Figure 6:
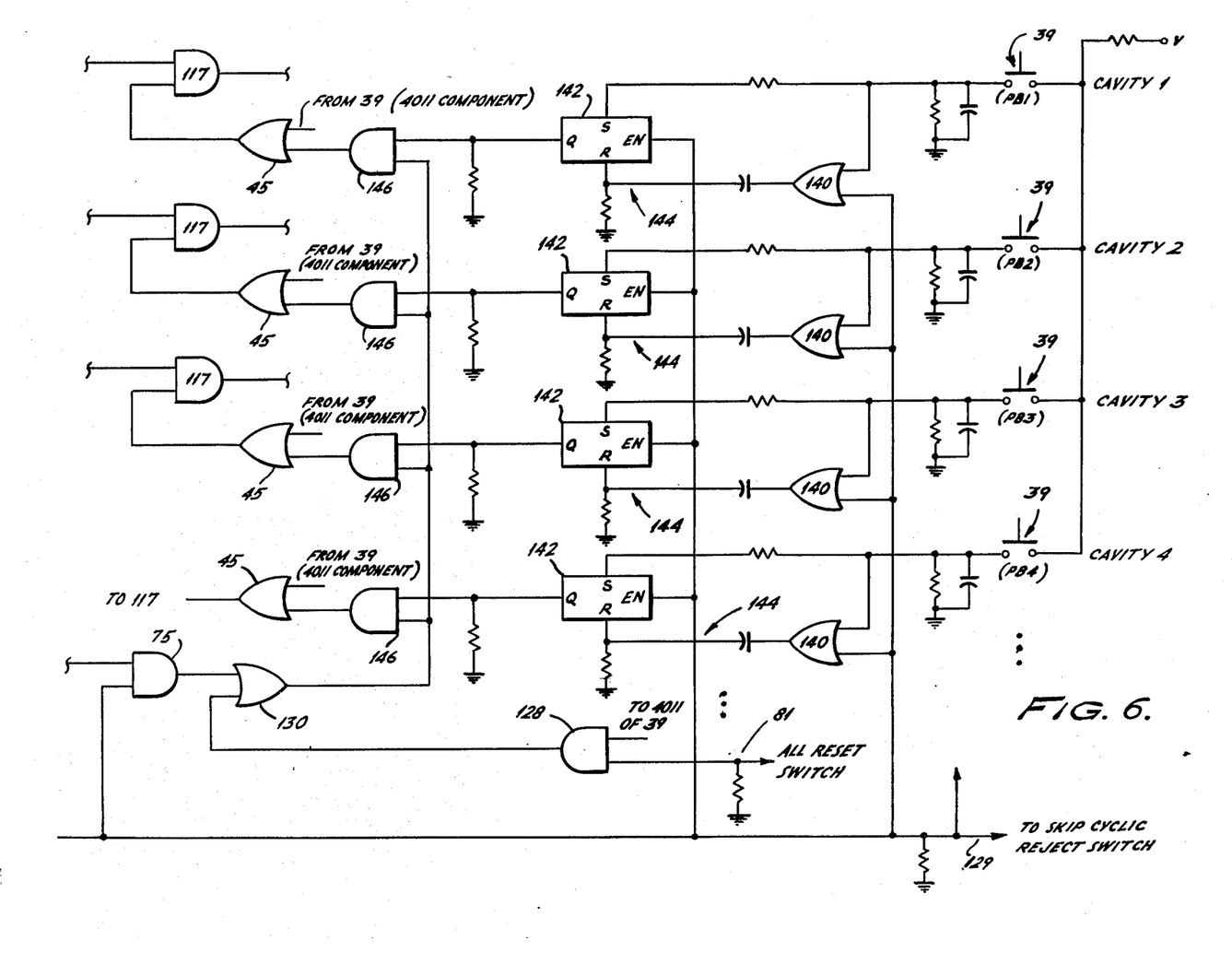
FIGS. 6 and 6a are alternate embodiments.

An alternative circuit for the predrive drive and gate circuit 45 and driver 17 circuit and its connection to the various cavity rejection push buttons 39 is shown in FIG. 6.

In this embodiment the skip cyclic rejection switch 129 is connected in common to an input of each of a plurality of OR gates 140, one for a dedicated circuit for each cavity.

The second input of each of these OR gates 140 is connected to its respective individual cavity reject push button 39, while the output of each OR gate 140 is connected to "reset" pin a respective individual flip flop 142 in each duplicate, dedicated circuit portion.

As in many other portions of the invention, an R-C filter 144 is used to isolate the reset pin of each flip flop 142 from noise.

The "set pin" of each flip flop 142 is connected in common to the second input of each OR gate 140.

The "enter" pin of each flip flop 142 is connected in common to the skip cyclic reset switch 129 while the "Q" output pin is connected to an input of a respective dedicated AND gate 146, of a plurality of said AND gates 146 implemented on a RCA 4081 type chip.

The output of the OR gate 130 is provided as a common input to each of the AND gates 146.

The output of each AND gate 146 is connected to an input of its respective predrive and gate circuit 45 as described herein above in connection with FIG. 6.

As discussed herein, each circuit is duplicated for each cavity. In connection with FIGS. 5 and 6 four cavities were discussed. The invention is not limited to any particular number of cavities, however.

An additional circuit feature can provide an electronic delay for the firing of the individual rejection devices 19. This will reduce the critical placement requirements upon those rejection devices 19 on the conveyor, allow for an individual calibration for the firing "time" for each individual rejection device, allow for any mechanical misalignments of the I.S. machine and provide a means for individual firing advance or retard of each rejection device 19 in relation to the I.S. machine.

Figure 6A:
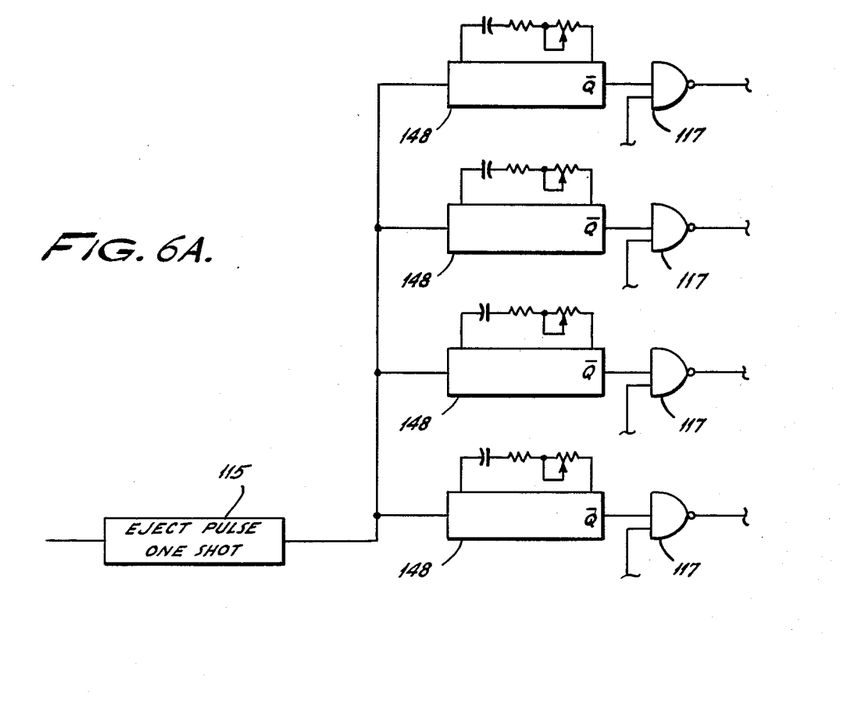

These features are implemented by the insertion of an additional "one shot" circuit 148 utilizing a RCA 4047 type chip, FIG. 6A, prior to each individual NAND gate 117 of predrive and gate circuits 45 for each cavity rejection device 19. Each individual one shot 148 has a time duration RC circuit and has its $\overline{Q}$ output connected to the respective individual NAND gate 117 of the respective predrive and gate circuit 45.

Many changes can be made in the above-described circuitry apparatus without departing from the intent and scope thereof. Modifications can be made in circuit functions and circuit implementation which are within the scope of the present invention. It is intended, therefore, that all matter contained in the above description and shown in the accompanying drawings be interpreted as illustrative and not be taken in a limiting sense.

What is claimed is:

1. A glassware rejection apparatus, for use in conjunction with a multi-section I.S. machine producing glassware, said apparatus being used to reject ware produced by said machine, comprising:
   a plurality of rejection devices being located down stream from said multi-section machine output and each being dedicated to reject ware from a respective one of said individual sections;
   stand alone control circuitry dedicated to control the operation of each of said plurality of rejection devices;
   a timing and speed of operation connection between said control circuitry and said I.S. machine; and
   an operator manually operated control connected to said control circuitry and operated to select rejection order, rejection sequence and rejection cycle.

2. The apparatus of claim 1 wherein said timing and speed of operation connection comprises:
   an electro-optical encoder coupled to said I.S. machine;
   a zero reset buffer connected to said encoder, and;
   a synchronous clock buffer connected to said encoder.

3. The apparatus of claim 2 wherein said control circuitry comprises first means for determining glassware article order and calculating timing sequence connected to said operator manually operated controls; and means for determining number of articles and the spacing between articles for rejection.

4. The apparatus of claim 3 wherein said operator manually operated controls comprises:
   a plurality of push buttons connected to said control circuitry;
   a selectable divide-by-n counter connected to said control circuitry, said divide-by-n counter also being connected to said zero reset buffer and said synchronous clock buffer;
   a plurality of toggle switches connected to said control circuitry;
   a cyclic rejection switch connected to said control circuitry;
   a repetitive rejection selection switch connected to said control circuitry; and
   an all cavity rejection selection switch connected to said control circuitry.

5. The apparatus of claim 4 wherein said control circuitry means for determining number of articles and spacing between articles for rejection, comprises:
   a sequencer connected to said selectable divide-by-n counter;
   a first programmer circuit connected to said sequencer;
   an article order select switch connected to said programmer; and to said plurality of toggle switches;
   wherein said plurality of toggle switches is also connected to said second programmer circuit.

6. The apparatus of claim 5 wherein said control circuitry means for determining glassware article order and calculation timing sequence, comprises:
   a second programmer circuit connected to said plurality of toggle switches;
   a skip address pointer circuit connected to said programmer circuit;
   a skip memory storage circuit connected to said skip address pointer circuit; and
   a plurality of skip programmer selection switches connected to said skip memory storage circuit; and
   a pulse generator connected to said selectable divide-by-n counter.

7. The apparatus of claim 6 wherein said control circuitry also comprises:
   a plurality of predrive and gate circuits connected to said pulse generator and said all cavity rejection selection switch and said plurality of toggle switches; and
   a plurality of driver circuits, connected one each to an individual one of said predrive and gate circuits, one each of said driver circuits being connected to a respective one of said rejection devices.

8. The apparatus of claim 7 wherein said control circuitry also comprises means for adjusting the time of operation of said plurality of predrive and gate circuits, said adjusting means being connected thereto.

9. The apparatus of claim 8 wherein said adjusting means permits individual advance and retard in time of operation of each said predrive and gate circuit.

10. The apparatus of claim 9 wherein said adjusting means includes a plurality of one-shot type circuits, each being individually adjustable and each being connected to a respective one of said predrive and gate circuits.

* * * * *

UNITED STATES PATENT AND TRADEMARK OFFICE
CERTIFICATE OF CORRECTION

PATENT NO. :    4,431,436
DATED      :    February 14, 1984
INVENTOR(S) :   Donald A. Lulejian It is certified that error appears in the above-identified patent and that said Letters Patent is hereby corrected as shown below:

Column 5, line 32 -- change "was" to "has"

Column 5, line 47 -- change "651" to "65"

*Signed and Sealed this*

*Twenty-first* Day of *August 1984*

[SEAL]

*Attest:*

GERALD J. MOSSINGHOFF

*Attesting Officer*     *Commissioner of Patents and Trademarks*